United States Patent [19]

Zanzucchi et al.

[11] Patent Number: 5,632,876
[45] Date of Patent: May 27, 1997

[54] APPARATUS AND METHODS FOR CONTROLLING FLUID FLOW IN MICROCHANNELS

[75] Inventors: Peter J. Zanzucchi, West Windsor Township; Sterling E. McBride, Lawrence Township, both of Mercer County; Charlotte A. Burton, Brick; Satyam C. Cherukuri, Cranbury, all of N.J.

[73] Assignee: David Sarnoff Research Center, Inc., Princeton, N.J.

[21] Appl. No.: 469,238

[22] Filed: Jun. 6, 1995

[51] Int. Cl.$^6$ .............................. B01D 61/42; F04F 11/00
[52] U.S. Cl. .............................. 204/600; 417/48; 417/49; 417/50; 417/53
[58] Field of Search .............................. 204/180.1, 182.1, 204/299 R, 600; 417/48, 49, 50, 53

[56] References Cited

U.S. PATENT DOCUMENTS

| | | | |
|---|---|---|---|
| 4,412,785 | 11/1983 | Roman | 417/50 |
| 4,676,274 | 6/1987 | Brown | 137/806 |
| 4,891,120 | 1/1990 | Sethi et al. | 204/299 R |
| 4,908,112 | 3/1990 | Pace | 204/299 R |
| 5,003,822 | 4/1991 | Joshi | 73/204 |
| 5,006,749 | 4/1991 | White | 310/323 |
| 5,141,868 | 8/1992 | Shanks et al. | 435/288 |
| 5,180,288 | 1/1993 | Richter et al. | 417/48 |
| 5,194,133 | 3/1993 | Clark et al. | 204/299 R |
| 5,250,263 | 10/1993 | Manz | 422/81 |
| 5,296,114 | 3/1994 | Manz | 204/180 |
| 5,304,487 | 4/1994 | Wilding et al. | 435/291 |
| 5,480,614 | 1/1996 | Kamahori | 422/70 |

FOREIGN PATENT DOCUMENTS

WO91/16966  11/1991  WIPO .
WO95/12608  5/1995  WIPO .

OTHER PUBLICATIONS

Dasgupta et al, "Electroosmosis: A reliable Fluid Propulsion System for Flow Injection Analysis", Anal. Chem. vol. 66, No. 11, Jun. 1, 1994, pp. 1792–1798.

Stuetzer, "Ion Drag Pumps", J. Appl. Physics, vol. 31 No. 1, Jan., 1960, pp. 136–146.
Pickard, "Ion Drag Pumping. I. Theory", J. Appl. Physics, vol. 34 No. 2, Feb. 1963, pp. 246–250.
Pickard, "Ion Drag Pumping. II. Experiment", J. Appl. Physics, vol. 34 No. 3, Feb. 1963, pp. 251–258.
Melcher, "Traveling–Wave Induced Electroconvection", The Physics of Fluids, vol. 9 No. 8, Aug. 1966, pp. 1548–1555.
Bart et al, "Microfabricated Electrohydrodynamic Pumps", Sensors and Actuators, A21–A23 (1990) pp. 193–197 no month provided.
Woolley et al. Ultra–High–Speed DNA Fragment Separations using Microfabricated Capillary Array Electrophoresis Chips, Proc. Natl. Acad. Sci. USA 91:11348–11352, Nov. 1994.
Harmon et al., Selectivity in Electrophoretically Mediated Microanalysis by Control of Product Detection Time, Anal. Chem. 66:3797–3805, 1994 no month.
Patterson, et al., Electrophoretically Mediated Microanalysis of Calcium, Journal of Chromatography A, 662:389–395, 1994 no month.
Microfabricated Device is Chemistry Lab on a Chip, Chemical & Engineering News, (no date).

(List continued on next page.)

*Primary Examiner*—Arun S. Phasge
*Attorney, Agent, or Firm*—William J. Burke

[57] ABSTRACT

By combining electro-osmotic and electrohydrodynamic pumps in a microchannel, both polar and non-polar fluids can be moved along said channel. The pumps can be made from pairs of wire electrodes inserted into openings in the channel and connected to a source of a pulsed DC power. By reversing the voltages on alternate pairs of pumps, fluid flow can be reversed, thereby acting as a gate or valve. By using digital drivers, for example shift registers that can apply a signal to a switching device connected to an electrode by means of enabling and latch signals to an AND gate, control of flow in individual channels in an array of channels can be had with a high degree of integration, and provide for ready manufacturability.

11 Claims, 3 Drawing Sheets

OTHER PUBLICATIONS

Harmon et al., Mathematical Treatment of Electrophoretically Mediated Microanalysis, Anal. Chem. 65:2655–2662, 1993 no month.

Avila and Whitesides, Catalytic Activity of Native Enzymes During Capillary Electrophoresis: An Enzymatic Microreactor, J. Org. Chem. 58:5508–5512, 1993.

Harmon, et al., Electrophoretically Mediated Microanalysis of Ethanol, J. Chromatog. A, 657:429–434, 1993 no month.

Bao and Regnier, Ultramicro Enzyme Assays in a Capillary Electrophoretic System, J. Chrom. 608:217–224, 1992 no month.

Richeter et al., A Micromachined Electrohydrodynamic (EHD) Pump, Sensors and Actuators A, 29:159–168, 1992 no month.

Tracey, et al., Microfabricated Microhaemorheometer, pp. 82–84, 1991 no month.

Jacobson et al., Precolumn Reactions with Electrophoretic Analysis Integrated on a Microchip, Anal, Chem., 66:4127–4123, 1994 no month.

Jacobson, et al., Effects of Injection Schemes and Column Geometry on the Performance of Microchip Electrophoresis Devices, Anal. Chem. 1994, 66:1107–1113 no month.

Jacobson, et al., High–Speed Separatioins on a Microchip, anal. Chem. 1994, 66:1114–1118 no month.

Fan, et al., Micromachining of Capillary Electrophoresis Injectors and Separators on Glass Chips and Evaluation of Flow at Capillary Intersections, Anal. Chem., 1994, 6:177–184 no month.

Megregany, Microelectromechnical Systems, Circuits and Devices, Jul. 1993.

Harrison, et al., Micromachining a Minaturized Capillary Electrophoresis–Based Chemical Analysis System on a Chip, Science, vol. 261, Aug. 13, 1993.

Harrison, et al., Capillary Electrophoresis and Sample Injection Systems Integrated on a Planar Glass Chip, Anal. Chem. 1992, 64:1926–1932 no month.

Fisher, Microchips for Drug Compounds, New York times, Mar. 3, 1991.

Fodor, ete al., Light–Directed, Spatially Addressable Parallel Chemical Synthesis, Research Article, Science, vol. 251, Feb. 15, 1991, pp. 767–773.

The Silver Shotguns, The Economist, Dec. 14–20, 1991.

Howe, et al., Silicon Micromechanics; Sensors and Actuators on a Chip, IEEE Spectrum, Jul. 1990.

Wenzel, et al., A Multisensor Employing an Ultrasonic Lamb–Wave Oscillator, IEEE Transactions on Electron Devices, vol. 35, No. 5, Jun. 1988.

Angell, et al., Silicon Micromechanical Devices, Scientifid American 248:44–55, 1983.

Petersen, Silicon as a Mechanical Material, Proceedings of the IEEE, vol. 79, No. 5, May 1982.

Andreas Manz et al., *Trends in Analytical Chemistry*, 10(5):144–148 (1991) (no month).

APPARATUS AND METHODS FOR CONTROLLING FLUID FLOW IN MICROCHANNELS

This invention relates to apparatus and method for controlling the flow of fluids within a microchannel. More particularly, this fluid flow control can operate both in a manner analogous to a pump and analogous to a valve.

BACKGROUND OF THE INVENTION

The principles of electroosmosis (EO), a process whereby applying a voltage to a fluid in a small space, such as a capillary channel, causes the fluid to flow, has been known for a long time. The surfaces of many solids, including quartz, glass and the like, become variously charged, negatively or positively, in the presence of ionic materials, such as for example salts, acids or bases. The charged surfaces will attract oppositely charged (positive or negative) counterions in aqueous solutions. The application of a voltage to such a solution results in a migration of the counterions to the oppositely charged electrode, and moves the bulk of the fluid as well. The volume flow rate is proportional to the current, and the volume flow generated in the fluid is also proportional to the applied voltage.

However, the fluid flow is also dependent on the type of fluid in the channel, e.g., the concentration of salts and the like. Dasgupta and Liu, Anal. Chem. 1994, 66, 1792–1798, teach conditions for the reliable use of electroosmosis for fluid pumping. However, electroosmosis can only be used with liquids having some conductivity and cannot be used for highly resistive, non-polar solutions, such as organic solvents.

For example Pace et al, U.S. Pat. No. 4,908,112, suggests the use of electro-osmotic pumps to move fluids through channels less than 100 microns in diameter. A plurality of electrodes were deposited in the channels which were etched into a silicon wafer. An applied electric field of about 250 volts/cm was required to move a fluid to be tested along the channel. However, when the channel is very long, that means a large voltage (kV) needs to be applied to the channel, which may be impractical for highly integrated structures. Pace et al suggested that the electrodes be staggered to overcome this problem, so that only small voltages could be applied to a plurality of electrodes. However, this requires careful placement and alignment of a plurality of electrodes along the channel.

Electrohydrodynamic (EHD) pumping of fluids is also known and may be applied to small capillary channels. The principle for pumping here is somewhat different. Electrodes in contact with the fluid when a voltage is applied, transfer charge either by transfer or removal of an electron to or from the fluid, such that liquid flow occurs in the direction from the charging electrode to the oppositely charged electrode. Electrohydrodynamic (EHD) pumps can be used for pumping resistive fluids such as organic solvents.

The advantages of electroosmotic and electrohydrodynamic pump devices are the absence of moving parts, which eliminate difficulties reported in the construction or applications of micromechanical pumps, which have found only limited utility to date. However, the recent development of devices based on very small size channels, particularly for the synthesis of pharmaceuticals or for the clinical testing of DNA and the like, require integrated pumps capable of moving or holding a wide variety of fluids which may be conductive or insulating.

Further, there is a need for a configuration of these pumps to provide one or more valves in the channel to stop and hold fluids, thereby acting as an equivalent of an electronic gate or a mechanical valve.

Still further, there is a need to configure the structure for providing power to the pumps so that each pump may be operated independently. Recently suggestions have been made for synthesizing large numbers of molecules in parallel, or for testing in parallel a plurality of samples for DNA diagnostics and the like. Such processes require a plurality of wells and channels. Various reagents or samples in the channels feed into and out of the wells for these proposed applications. The well known use of an operational amplifier (driver) connected to each pump is impractical for a large array of channels. Thus it would be highly desirable to be able to control the flow of fluids in the various channels independently, without the need for an operational amplifier driver for each channel.

SUMMARY OF THE INVENTION

We have found that excellent control of the flow of fluids, as well as excellent control of the stop and hold of fluids in a plurality of microchannels can be achieved with a high degree of integration of EO and EHD structures in a capillary system. Wire electrodes can be inserted into the walls of the channels at preselected intervals to form alternating EO and EHD devices. Using a digital driver consisting of, for example, a shift register, latch, gate and switching device, such as a DMOS transistor, permits simplified electronics so that fluid flow in each of the channels can be controlled independently. Because EO and EHD pumps are both present, a plurality of different solutions, both polar and non-polar, can be passed along a single channel. Alternatively, a plurality of different solutions can be passed along a plurality of different channels connected to a well. The microchannels are preferably formed in a glass substrate.

DETAILED DESCRIPTION OF THE INVENTION

Either EO or EHD pumps can be made in small channels in accordance with the present invention.

Figure 1:
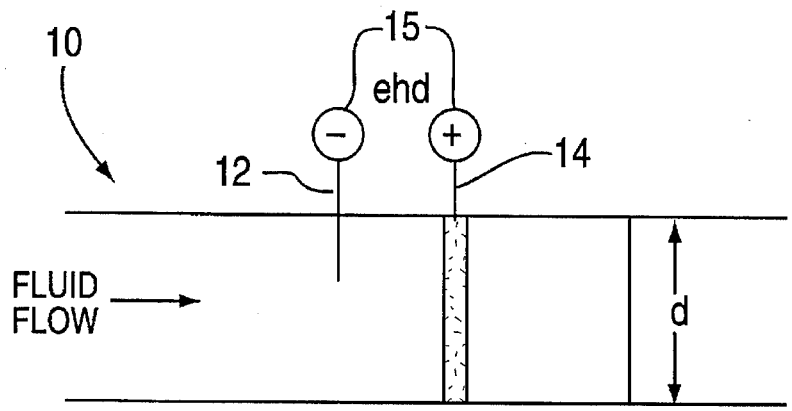
FIG. 1 is a cross sectional view of an illustrative EHD pump of the prior art.

FIG. 1 shows a design for an electrohydrodynamic (EHD) pump in a channel. This pump is useful for pumping highly resistive solvents such as ethanol and acetone. A channel 10, shown in cross section, has a diameter "d". This diameter "d" is suitably about 100–400 microns for example. A wire 12, to be connected to a source of power so that it has one polarity of voltage, illustrated as a negative voltage, is inserted into the wall of the channel 10 through an opening (not shown). A second wire 14, to be connected so that it has an opposite polarity of voltage, illustrated as a positive voltage, is inserted into a second opening (not shown) in the wall of the channel 10. The wires 12 and 14 are attached to a source of dc power capable of applying a voltage of at least about 40 volts, and preferably 100 volts or higher, forming an EHD pump 15. Suitably the applied voltage is from 0 to 300 volts.

The effectiveness of the pump depends on the spacing between the two electrodes 12 and 14. The closer together they are, the smaller the voltage required to be applied to effect fluid flow.

The above EHD pump 15 can be made as follows. Two openings are laser drilled into the walls of a microchannel 10 wherein "d" is about 150–400 microns. Two metal wires, for example gold or platinum wires about 1–10 mils in diameter, are inserted into the openings in the channel walls about, e.g., 150 microns apart. The wires were sealed into the channels by means of a conventional gold or platinum via fill ink made of finely divided metal particles in a glass matrix. After applying the via fill ink about the base of the wire on the outside of the opening, the channel is heated to a temperature above the flow temperature of the via fill ink glass, providing an excellent seal between the wires and the channel.

Fluid flow was established by the flow of a fluid such as ethanol from the horizontal channel, and was also observed by adding small, insoluble particles to the fluid and observing the pumping action. Test voltages used may be up to about 1500 volts, but an operating voltage of about 40–300 volts is desirable.

The principle and configuration of EO pumps are similar to EHD pumps except that for EHD pumps the spacing between the electrodes (or wires) should be as small as possible, whereas the spacing between electrodes for EO pumps should be larger, up to one-half the length of the channel in which fluids are being moved. When conductive fluids such as aqueous solutions are to be pumped, EO pumps are used. These pumps are also free of moving parts and are thus very attractive for pumping fluids through very small channels.

In accordance with the present invention, these two types of pumps are combined. Thus both polar, such as inorganic, and non-polar, such as organic, fluids can be moved sequentially along the same capillary size channels. For example, when a plurality of syntheses are to take place in an array of wells, each connected to a plurality of channels for moving fluid reactants and diluents into and out of the wells, both organic and inorganic reagents may be required.

Figure 2:
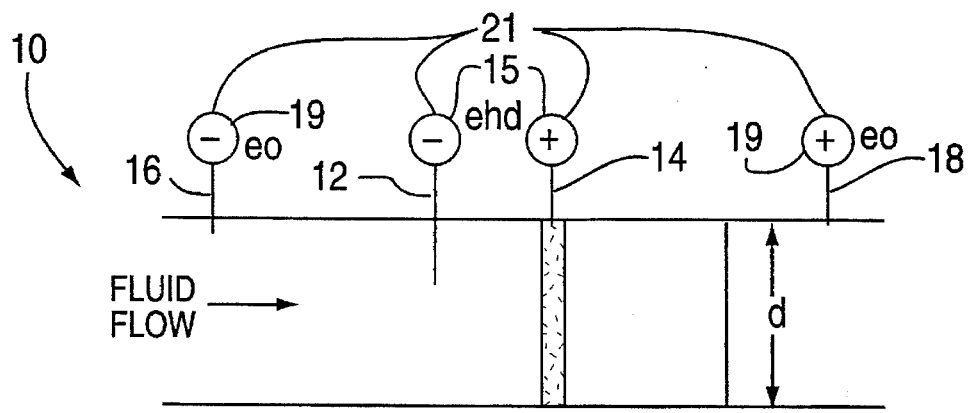
FIG. 2 is a cross sectional view of an illustrative combined EO/EHD pump of the invention.

A combined EO and EHD pump 21 is shown in FIG. 2. The EHD pump 15 is the same as shown in FIG. 1. Two wires 12 and 14 are inserted into the wall of a capillary channel 10, as close together as possible, since the closer together the wires, the smaller the applied voltage needs to be. Two additional wires 16 and 18, connected so that they have an opposite polarity with respect to voltage, are inserted into the wall of the channel 10 on either side of the wires 12 and 14 of the EHD pump 15 to form an EO pump 19. The wires 16 and 18 forming the EO pump 19 should be farther apart than the wires 12 and 14 that form the EHD pump 15.

After sealing the wires 12, 14, 16 and 18 using a via fill ink, the channel 10 is filled with a solution such as an ethanol/water mixture, or a buffered aqueous solution. An applied voltage of up to 1500 volts may be used for testing purposes, but an operating voltage of about 40–300 volts is generally connected to the wires.

A pumping action was observed by a flow of solution from an end of a horizontally mounted capillary tube 10. The pumping action was also observed by adding small, solid, insoluble particles to the fluid and video taping the flow along the channel.

The EO pump 19 or the EHD pump 15 can also be connected to the voltage supply by reversing the polarity so that the voltages on the electrodes cause flow in opposing directions. For example, since fluid flow for EHD pumping proceeds in a preferential direction from one electrode to the other, if the voltages of one set of EHD electrodes is made opposite to the voltages of an alternate set of EHD electrodes, the flow of each set oppose each other, effectively stopping the flow in the channel, and acting as a gate or a valve. This opposing configuration of EO and EHD pumps, and simplified structure for providing voltage to power the pumps, as further explained hereinbelow, will provide a non-mechanical pump and valve for controlled movement of fluids in channels having capillary dimensions. Such a configuration of devices is highly suitable for the development of complex transport of fluids for the purposes of parallel array format for chemical synthesis, for screening of biological organic and inorganic compounds, and for clinical diagnostic assay of biological organic and inorganic compounds.

The voltage required to be applied to the electrodes to cause fluid flow depends on the geometry of the electrodes and the properties of the fluids to be moved. The flow rate of the fluids is a function of the amplitude of the applied voltage between electrodes, the electrode geometry and the fluid properties, which can be determined experimentally for each fluid.

An analog driver is generally used to vary the voltage applied to the EO/EHD pump from a DC power source. A transfer function for each fluid is determined experimentally as that applied voltage that produces the desired flow or fluid pressure to the fluid being moved in the channel. However, an analog driver is required for each pump along the channel and is suitably an operational amplifier.

Figure 3:
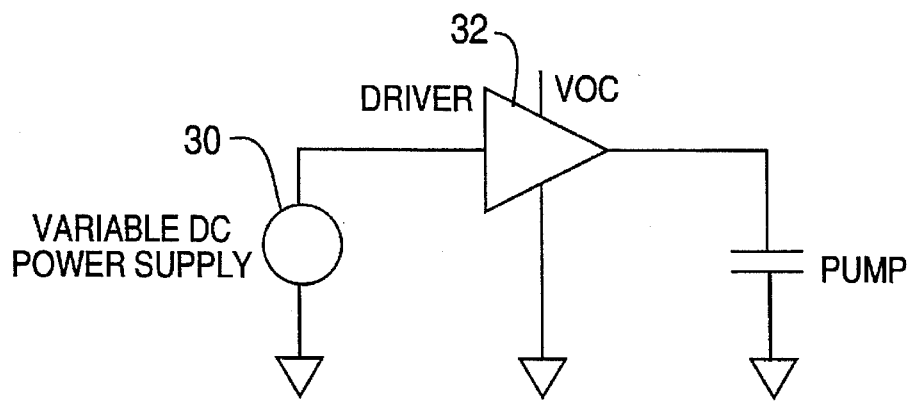
FIG. 3 is a block diagram of an analog driver useful for controlling the flow of fluids in a channel.

A block diagram showing a useful prior art analog driver is shown in FIG. 3. A variable DC power supply or D/A converter 30 is connected through an analog driver 32 (operational amplifier) to the EO or EHD pump to be used. Thus this configuration requires a separate analog driver for each EO or EHD pump. This is impractical when a large number of channels are to be controlled.

Figure 4:
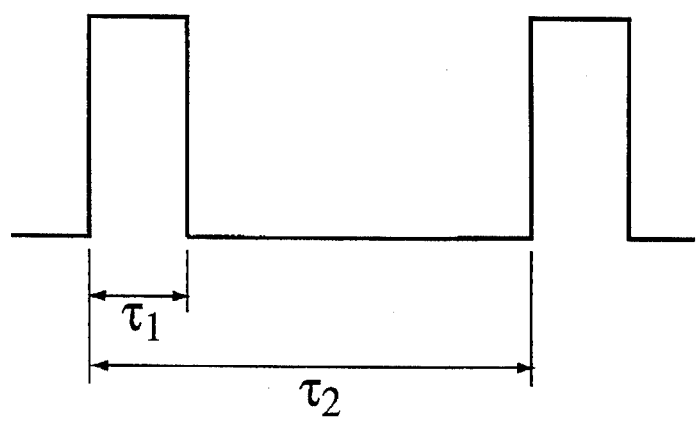
FIG. 4 is a pulse train for a digital driver useful herein.

Thus a digital driver having a pulse of suitable voltage amplitude and that can provide gating control to the electrodes is preferred for use herein. Control of fluid flow is accomplished by applying pulses of different pulse widths and different repetition rates to the electrodes. A typical pulse train is shown in FIG. 4 wherein $t_1$ is the pulse width and $t_2$ is the distance between pulses.

Figure 5:
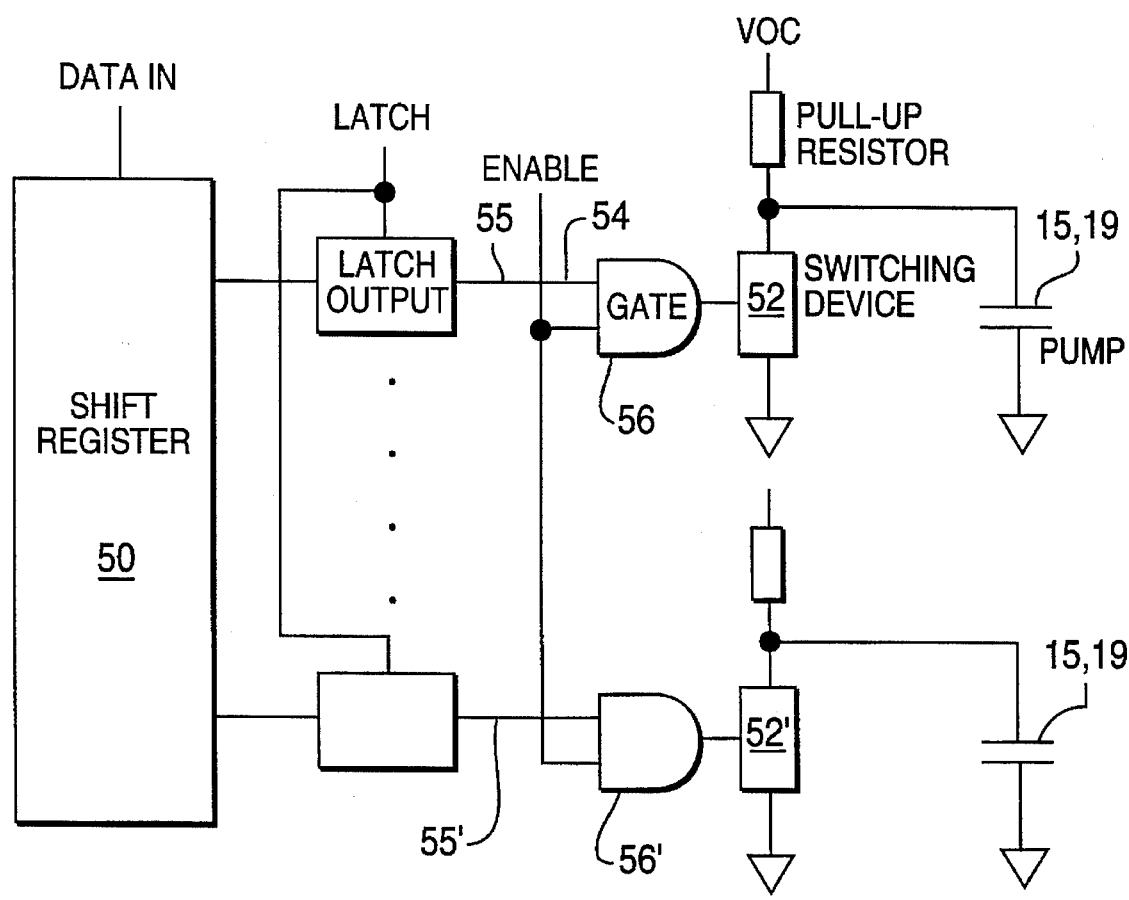
FIG. 5 is a block diagram of a digital driver useful for controlling fluid flow in multiple channels in parallel.

FIG. 5 illustrates one configuration for providing control of fluid flow of a plurality of channels simultaneously and independently. The data generated for the above variables, as obtained experimentally for various fluids and electrodes, is loaded into a computer (not shown). The computer converts the data to instructions for the digital driver to a pump 15 or 19. The data is transferred to the digital driver and is stored in the shift register 50. Different switching devices 52 attached to each electrode pair can be selected, independently of each other, depending on the state of the latch output. The switching devices are turned on and off by an enabling signal 54 and a latch output signal 55 applied to an AND gate 56. A pulse of a particular width and repetition rate is applied to the enable signal 54 which determines the length of time the switch is on or off. Thus the fluid flow in the channel can be controlled using a signal having constant amplitude but variable pulse width and repetition rate. By preselecting the pulse repetition rate, a predetermined applied voltage is selected for each pump 15 or 19 in a channel 10.

An array of the above switching devices 52 can be connected to the shift register 50 for controlling the fluid flow of an array of channels, each switching device controlling the fluid flow in a different channel. A single switching device 52', connected to the shift register 50 through a gate 56', an enable signal 54' and a latch signal 55', is shown for simplicity in FIG. 5, but a plurality of switching devices will be used, one for each pump in the array of channels.

Figure 6:
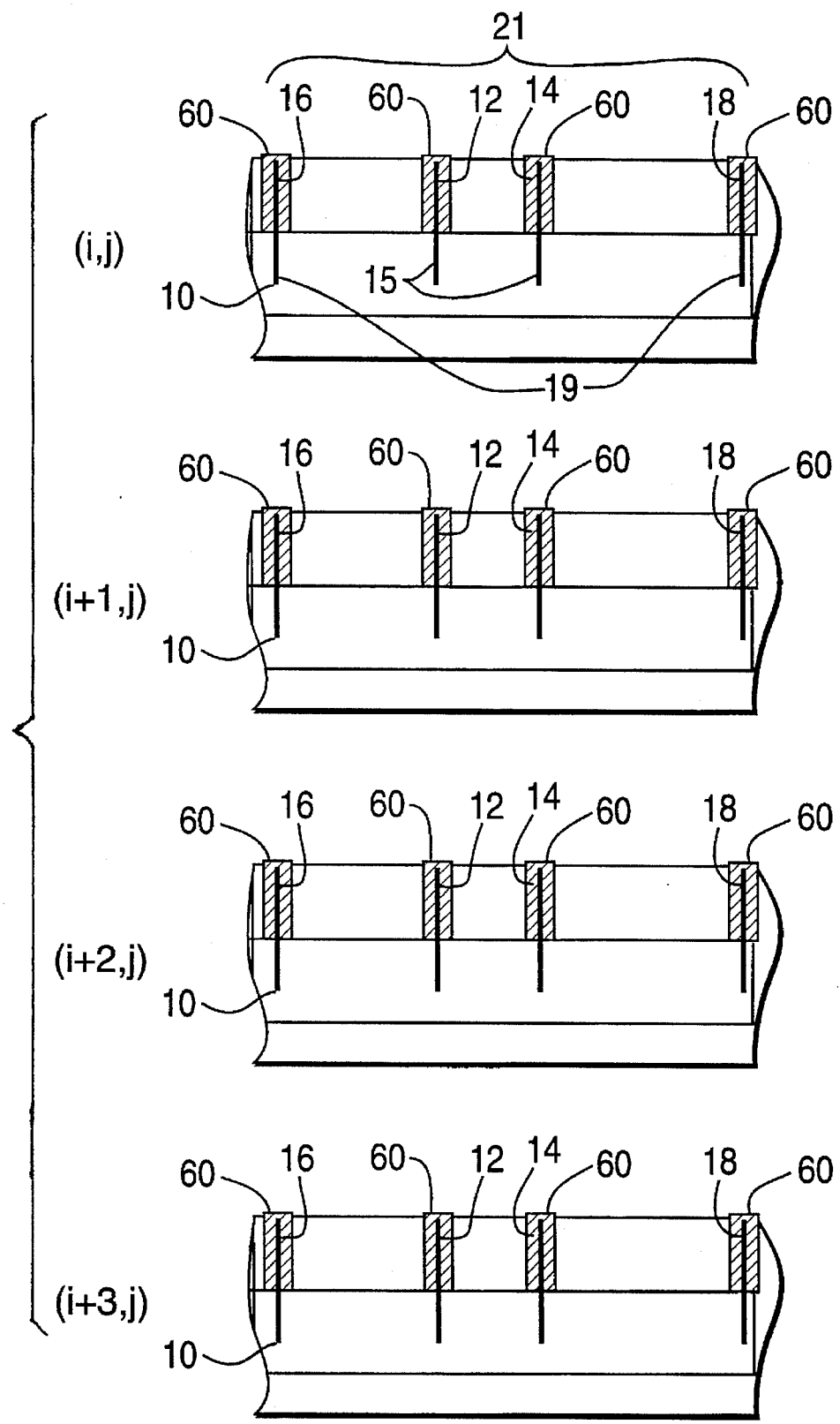
FIG. 6 is a cross sectional view of a dual pump configuration for a row of parallel channels.

FIG. 6 illustrates the simple dual pump configuration 21 in a cross sectional view of a row of channels (i, j) in a parallel, partitioned array. The digital driver (not shown) contacts the upper surface of the conductive via fill ink seals 60 that seal the wires 12, 14, 16 and 18, such that each of the channels 10 may be pumped independently. The dual configuration of EO pump 19 and EHD pump 15 is most critical for this application, because the array can be used to synthesize various compounds, to screen compounds or to perform clinical assays. The various fluid flows required need to be stopped and started based on the needs of these applications. This is achieved by the dual pump configuration and the use of opposite pumping modes as described hereinabove.

The present invention provides improved manufacturability for pumping fluids through microchannels, and provides independent control of a plurality of channels that can contain a variety of polar and non-polar fluids with a high degree of integration.

Although the present invention has been described in terms of particular devices and methods, other devices and methods will be known to one skilled in the art and are to be included herein. The invention is only meant to be limited by the scope of the appended claims.

We claim:

1. A pumping device in a microchannel comprising electrodes situated alone the length of the microchannel, two of which are separated by a first length of microchannel and can be operated together to form an electrohydrodynamic pump and two of which are separated by a second length of microchannel and can be operated together to form an electro-osmotic pump, wherein the second length is greater than the first length.

2. The pumping device according to claim 1, further comprising additional electrohydrodynamic or electroosmotic pumps present in said microchannel.

3. The pumping device according to claim 2, comprising a first electrohydrodynamic or electro-osmotic pump located in the microchannel that can be operated with a first voltage and a second electrohydrodynamic or electro-osmotic pump that can be operated with a second voltage of opposite polarity from the first voltage, wherein such operation of the first and second pumps is effective to stop the flow of fluid in the microchannel.

4. The pumping device of claim 3, wherein the first and second pumps are either both electrohydrodynamic pumps or are both electro-osmotic pumps.

5. The pumping device according to claim 1 wherein the microchannel is formed in a substrate and said electrodes are wires inserted through the substrate so that they protrude into said microchannel.

6. The pumping device according to claim 1 wherein said microchannel is formed in glass and said electrodes are wires inserted through holes in the glass, and wherein said holes are sealed with a conductive via fill ink.

7. The pumping device of claim 6, wherein the conductive via fill ink is sintered.

8. An array of parallel microchannels for conducting chemical reactions, for screening of biological organic and inorganic compounds, or for the assay of compounds, the array comprising parallel microchannels and a pumping device of claim 1 inserted in each microchannel.

9. The pumping device of claim 1, wherein the microchannel has a diameter of about 400 μm or less.

10. The pumping device of claim 1, wherein the microchannel has a diameter of from about 100 μm to about 400 μm.

11. The pumping device of claim 1, wherein the electrohydrodynamic pump comprises a first electrode and a second electrode from among the electrodes situated along the length of the microchannel and the electro-osmotic pump comprises a third electrode and a fourth electrode from among the electrodes situated along the length of the microchannel.

\* \* \* \* \*